(12) United States Patent
Fields

(10) Patent No.: US 9,469,449 B1
(45) Date of Patent: Oct. 18, 2016

(54) LID WITH HANDLE-ACTIVATED SEAL

(71) Applicant: Omega Products, Inc., Harrisburg, PA (US)

(72) Inventor: Timothy Fields, Hummelstown, PA (US)

(73) Assignee: Omega Products, Inc., Harrisburg, PA (US)

( * ) Notice: Subject to any disclaimer, the term of this patent is extended or adjusted under 35 U.S.C. 154(b) by 0 days.

(21) Appl. No.: 14/317,859

(22) Filed: Jun. 27, 2014

(51) Int. Cl.
*B65D 39/12* (2006.01)
*B65D 45/34* (2006.01)
*B65D 43/26* (2006.01)

(52) U.S. Cl.
CPC ............. *B65D 45/34* (2013.01); *B65D 43/265* (2013.01)

(58) Field of Classification Search
CPC ................. A47J 36/10; B65D 2543/00564
USPC ....... 215/279, 280, 284, 294, 303, 304, 358, 215/359, 326, 354, 320, 346, 360, 361, 215/362; 220/233, 234, 238, 254.7, 254.9, 220/256.1, 262, 351, 345.6, 796, 345.5, 220/801, 802, 803, 804
See application file for complete search history.

(56) References Cited

U.S. PATENT DOCUMENTS

| 741,989 A | * | 10/1903 | Van Der Heide | 215/311 |
| 8,186,527 B2 | * | 5/2012 | Liu | 215/317 |
| 2011/0036837 A1 | * | 2/2011 | Shang | 220/240 |
| 2014/0263340 A1 | | 9/2014 | Audette | |

* cited by examiner

*Primary Examiner* — J. Gregory Pickett
*Assistant Examiner* — Allan Stevens
(74) *Attorney, Agent, or Firm* — Nicholas Pfeifer; Ronald E. Smith; Smith & Hopen, P. A.

(57) ABSTRACT

A container lid having a handle-activated seal includes a base having an aperture so that food items can be charged into the container through the aperture, a closure member for closing the aperture, a main body that circumscribes the base, a handle and a gasket. The base and main body are movably mounted with respect to one another and the main body is driven downwardly when the handle is pivoted from a vertical configuration to a folded, horizontal configuration. The main body has a lower peripheral edge spaced a small vertical distance above the gasket when the handle is in a vertical, not pivoted position. The gasket is driven by the downward travel of the main body into sealing relation with the rim of a container when the handle is pivoted into its horizontal, folded configuration.

10 Claims, 7 Drawing Sheets

LID WITH HANDLE-ACTIVATED SEAL

BACKGROUND OF THE INVENTION

1. Field of the Invention

This invention relates, generally, to means for sealing containers. More particularly, it relates to a lid for a blender that sealingly engages the rim of the blender when a handle that forms a part of the lid is folded.

2. Description of the Prior Art

Conventional blenders and other containers have lids that are press fit into closing relation to the container. The lids are thus easily opened by manually overcoming the friction of the press fit. If such a lid includes a handle, a user may lift the container by the handle when the container is full. If the contents are sufficiently heavy, the weight of the contents may cause the lid to separate from the container, thus spilling the contents from the container.

There is therefore a need for a lid that provides a better seal than a conventional press fit. A lid that seals tightly about the rim of a container and which creates a small vacuum within the container would hold the lid so that neither manual strength nor the weight of the container would provide adequate force to separate the lid from the container.

However, in view of the art considered as a whole at the time the present invention was made, it was not obvious to those of ordinary skill in the art how the needed lid could be provided.

SUMMARY OF THE INVENTION

The long-standing but heretofore unfulfilled need for an improved container lid is now met by a new, useful, and non-obvious invention.

All relative terms used herein such as "upwardly," "downwardly," "horizontally," and "vertically" refer to a container such as but not limited to a blender that is supported by a horizontal support surface such as a table top in a conventional way, i.e., with the container in an upstanding configuration on such support surface with its rim at the uppermost end of the container. The novel lid surmounts the container and sealingly engages the rim when a lid handle is in a horizontal orientation and disengages the rim when the lid handle is in a vertical orientation.

The novel structure includes a base having an aperture formed therein so that food items can be charged into the container through the aperture, a closure member for closing that aperture, a main body that circumscribes the base, a gasket that underlies the main body, and a handle that seals the gasket to the container rim by displacing the main body downwardly toward the container rim, thereby driving the gasket into sealing engagement with the rim when the lid handle is pivoted from a vertical to a horizontal configuration.

The handle is pivotally connected to the base and includes protrusions that bear against and drive the main body downwardly toward the container rim when the handle is folded from its vertical to its horizontal configuration.

The base and main body are movably mounted with respect to one another so that the main body but not the base is displaced downwardly toward the container rim when the handle is folded downwardly.

The lower peripheral edge of the main body is spaced a small vertical distance above the gasket when the handle is in a vertical, not pivoted position. The main body and the gasket have no vertical space between them when the handle is in a pivoted, horizontal position, i.e., pivoting the handle from its vertical to its horizontal configuration drives the lower peripheral edge of the main body downwardly into engagement with the gasket, driving the gasket into sealing relation with the container rim and creating a small vacuum within the container that defeats facile separation of the lid from the container as long as the handle remains in its downwardly folded position.

The base includes upstanding, vertical sidewalls that collectively form a square configuration having rounded corners. A horizontally-disposed flange is formed integrally with the upstanding walls, about mid-height thereof. The flange extends radially inwardly for a predetermined distance such that the radially innermost end of the flange defines the aperture formed in the base.

The radially innermost end of the flange is downwardly turned to create a detent that circumscribes the underside of the aperture.

The closure member includes a flat top wall of square configuration. A finger-receiving recess is formed in each edge of the top wall, mid-length thereof, to facilitate manual removal of the closure member from its engagement with the aperture.

A plurality of detent walls depend from the flat top wall and a radially-outwardly or outboard-extending detent is formed at a lowermost end of each detent wall. Each of these detents engages the detent formed on the underside of the aperture by the radially-inwardly extending flange to releasably secure the closure member in closing relation to the aperture.

More particularly, each detent wall is momentarily displaced radially inwardly as the closure member is inserted into the aperture but each detent wall snaps back into its position of repose under an inherent bias and engages the flange detent as each detent wall detent slides over the detent formed in the radially-inwardly extending flange.

A plurality of stop walls also depends from the top wall, there being as many stop walls as there are detent walls. Each stop wall is parallel to and positioned radially outwardly or outboard of an associated detent wall and has a shorter extent than its associated detent wall. The lowermost end of each stop wall abuts the radially inwardly extending flange when the detent wall detents engage the downwardly turned ends of the flange.

A radially outwardly extending horizontal wall is formed integrally with each of the upstanding sidewalls of the base at the lower end thereof. A wall having a J-shape in transverse section, i.e., having a vertical section and an arcuate horizontal section, depends from the radially outwardly extending horizontal wall. Accordingly, the horizontal wall and the arcuate horizontal section are vertically spaced apart from one another by the extent of the vertical section.

The annular gasket has a first, innermost end captured within the vertical space between the horizontal wall and the horizontal arcuate section and a second, radially-outwardly and upwardly extending free end.

A radially outwardly extending ridge is formed integrally with the main body in circumscribing relation thereto and divides the main body into an upper main body and a lower main body.

The lower main body has a constant vertical extent around a periphery of the main body and a lower peripheral edge of said lower main body is disposed in closely vertically-spaced apart relation to the free end of the gasket when the handle is in its vertical configuration.

The upper main body is divided into two (2) discontinuous sections, referred to herein as the first and second sections of the upper main body. Those two (2) sections are disposed in mirror-image, opposed or confronting relation to one another such that their respective opposite ends are spaced apart from one another. The opposite ends of the handle are positioned in the spaces between the two (2) discontinuous sections.

The first section has a predetermined vertical extent and a predetermined peripheral extent that extends less than half way about the main body. The second section has a predetermined vertical extent and a predetermined peripheral extent that also extends less than half way about the main body.

The predetermined vertical extent of the first section is greater than the predetermined vertical extent of the second section.

The predetermined peripheral extent of the first section has a hollow construction and includes an outer wall and an inner wall interconnected at their respective upper ends by a horizontal top wall. The inner wall of the first section is parallel and adjacent to a sidewall of the base but said walls are not interconnected to one another.

The predetermined peripheral extent of the second section also has a hollow construction and includes an outer wall and an inner wall interconnected at their respective upper ends by a horizontal top wall. The inner wall of the second section is also parallel and adjacent to a sidewall of the base but said walls are not interconnected to one another.

The handle is an integrally formed part having opposing ends which have a first predetermined thickness. The opposing ends are interconnected to one another by a middle section having a second predetermined thickness which is less than the first predetermined thickness. The first thickness is substantially equal to the predetermined vertical extent of the upper wall and the second thickness is substantially equal to a difference in vertical extents between the first section and the second section of the discontinuous upper main body.

Accordingly, when the handle is in its folded configuration, the opposing ends of the handle are flush with the top wall of the first section of the main body and the middle section of the handle is flush with the top wall of the second section of the main body.

A protuberance is formed on each of the opposite ends of the handle. When the handle is pivoted from its unfolded configuration to its folded configuration, the protuberance bears against the ridge that circumscribes the main body in the space between the first and second sections of the main body.

The protuberances drive the ridge and hence the main body downwardly so that the bottom peripheral edge of the main body outer wall abuts and drives the gasket downwardly into sealing engagement with the container rim.

Each end of the handle has a peg-receiving opening formed therein on an inboard side thereof. A peg is formed integrally with each upstanding sidewall of an opposed pair of upstanding sidewalls and each peg extends radially outwardly, i.e., in an outboard direction, into each peg-receiving opening so that the handle is pivotable between its unfolded position and its folded position.

The second section of the upper main body is dished so that the fingers of a user may enter into the dished region when lifting the handle from its folded position, i.e., the dished region provides an undercut to facilitate grasping of the folded handle.

The primary object of the invention is to provide a container lid that seals a container when a handle is displaced from a vertical position to a horizontal, folded position.

A closely related object is to provide a container lid of robust construction so that it can perform the sealing operation many times without failure.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1A:
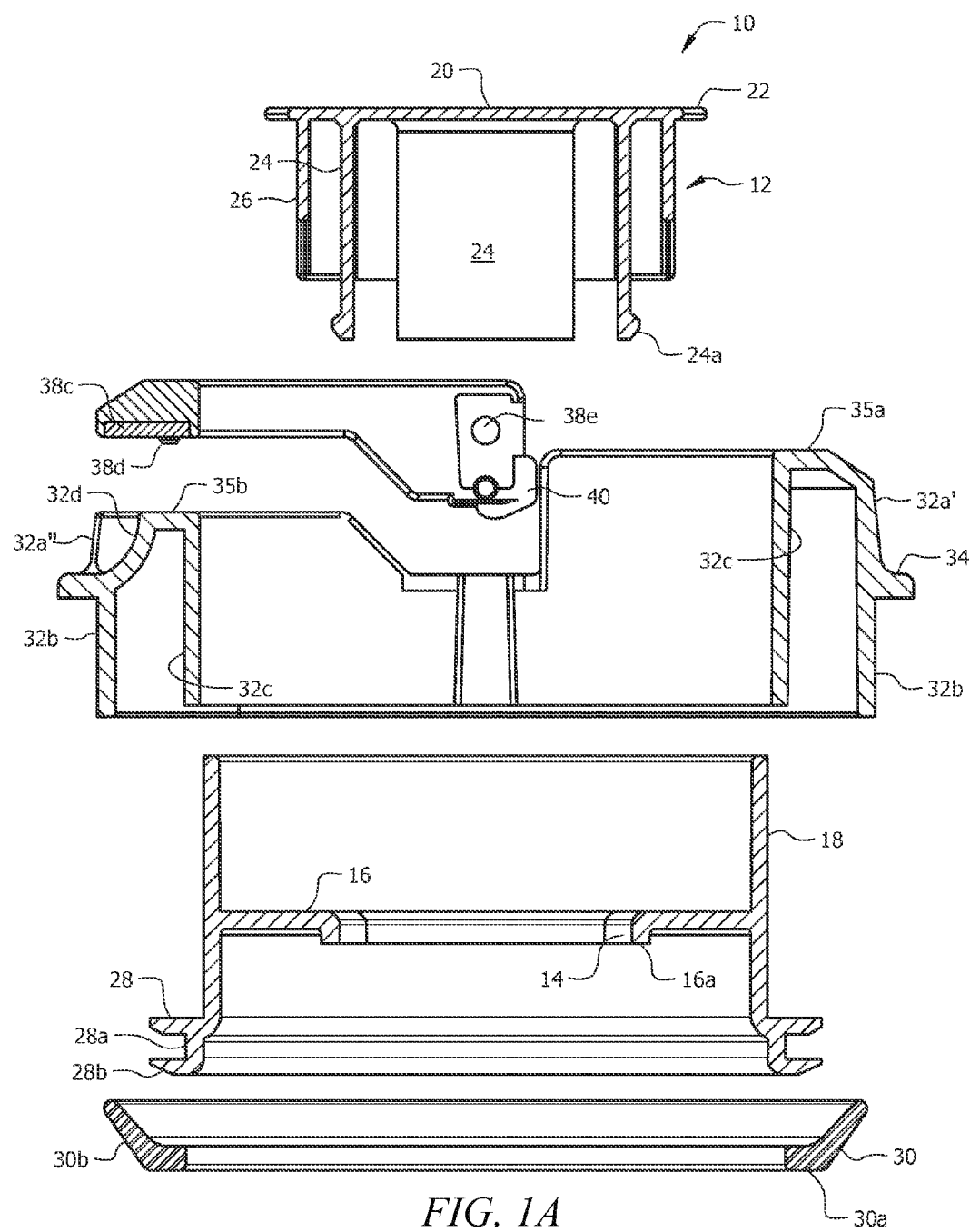
FIG. 1A is an exploded, vertical sectional view of the novel structure.

FIG. 1 depicts an illustrative embodiment of the novel lid structure which is denoted as a whole by the reference numeral 10 in exploded view and in vertical section, defining vertical as the upstanding configuration of a blender, not depicted in FIG. 1, when supported by a horizontal table top. Novel lid 10 surmounts the blender and closes its open top by engaging its rim. Novel lid 10 is disposed in a horizontal plane when so engaged and is depicted in said horizontal plane.

Novel lid 10 is formed of five main parts, i.e., a base having an aperture formed in it, a closure member that releasably closes that aperture, a main body that circumscribes the base, a handle pivotally mounted to the base, and a gasket mounted to the base in underlying relation to the main body.

The base and main body are movably mounted with respect to one another. The gasket is closely vertically spaced apart from a lower peripheral edge of the main body when the handle is in its vertical position. Pivotal movement of the handle from its vertical position to a horizontal position pushes the main body downwardly relative to the base so that the lower peripheral edge of the main body engages and pushes the gasket downwardly. The gasket circumscribes the rim of a blender or other container and forms a vacuum within the hollow interior of the blender when it is displaced downwardly.

Figure 2A:
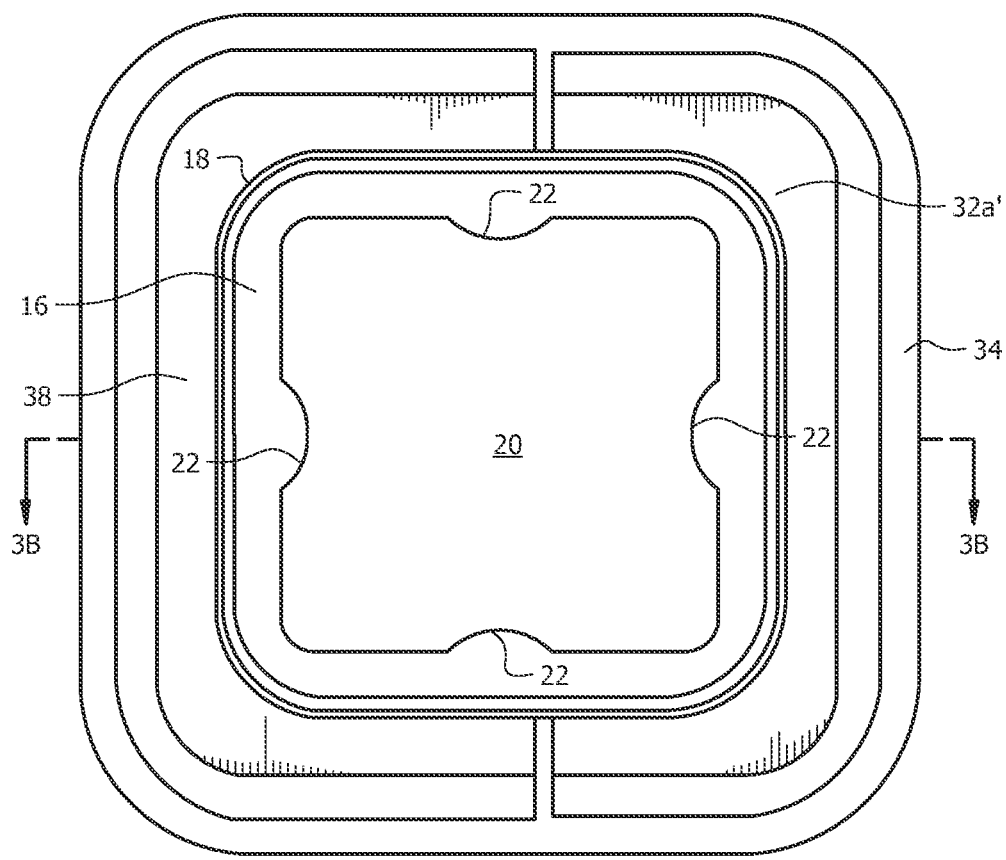
FIG. 2A is a top plan view of the lid in its closed and locked configuration.
Figure 2B:
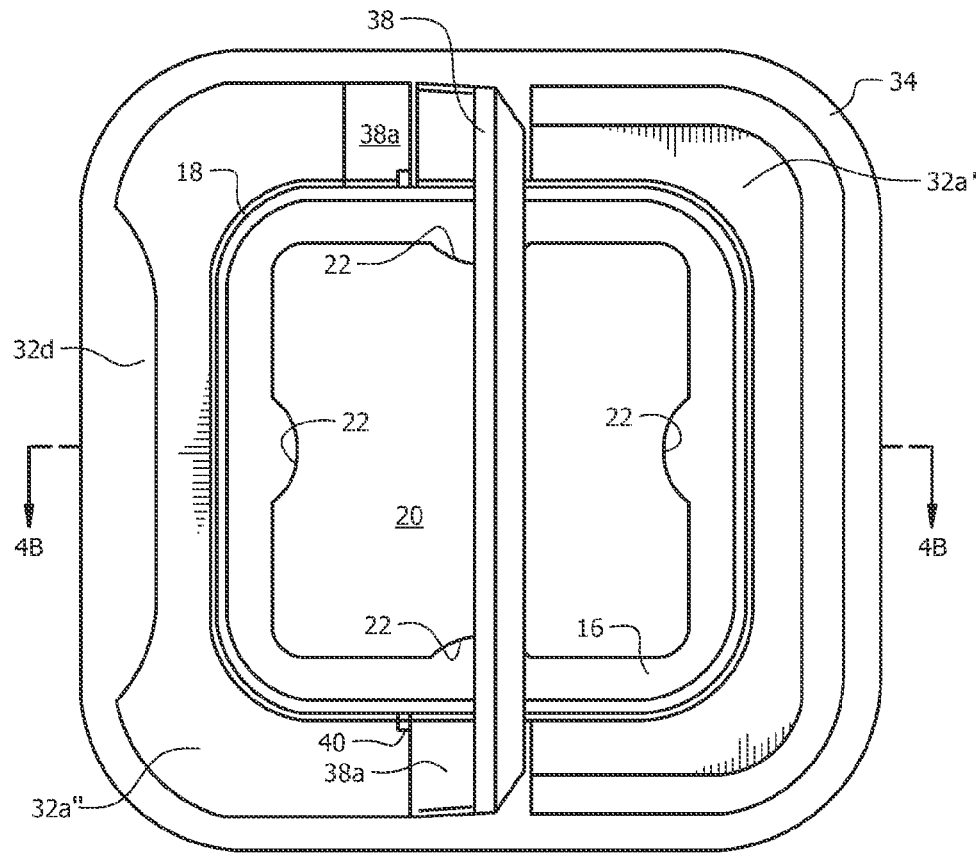
FIG. 2B is a top plan view of the lid with its handle up, i.e., in its open and unlocked configuration.

Lid 10 includes removably mounted closure member 12 that serves as a shield relative to aperture 14. Said aperture 14 is defined by horizontally-extending flange 16 that is formed integrally with upstanding walls 18 that collectively form a square configuration with rounded corners as depicted in the top plan view of FIGS. 2A and 2B. Flange 16 extends radially inwardly or in an inboard direction from said upstanding walls 18 and defines aperture 14.

The inboard end of flange 16 is turned downwardly to form a detent as at 16a as depicted in FIG. 1A.

Figure 1B:
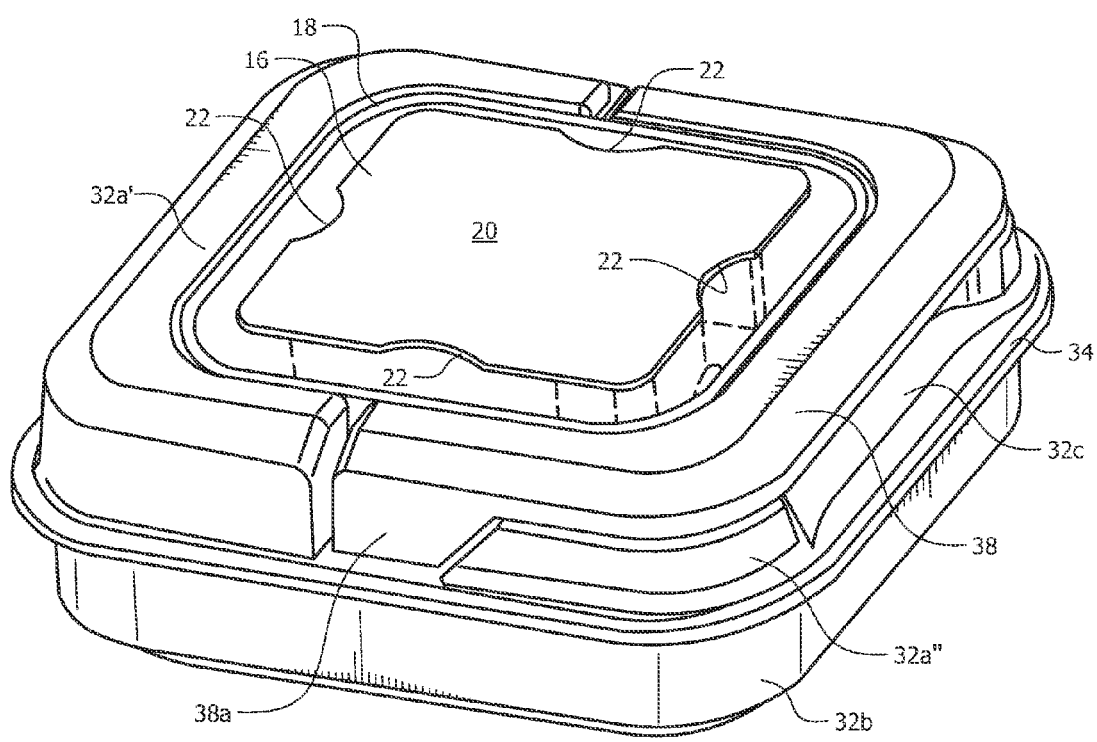
FIG. 1B is a perspective view of the novel lid in its closed and locked configuration, i.e., when the handle is folded down.

As best depicted in FIGS. 1A and 1B, closure member 12 includes flat top wall 20 of generally square configuration. A finger-receiving recess, denoted 22, is formed in each edge of said top wall, mid-length thereof. Recesses 22 facilitate manual removal of closure member 12 from its engagement with aperture 14.

More particularly, and as best depicted in FIG. 1A, detent 16a of flange 16 is engaged by a radially-outwardly extending detent 24a formed at the lowermost end of each detent wall, collectively denoted 24, that depends from top wall 20. When closure member 12 is placed into closing relation to aperture 14, detents 24a are momentarily displaced radially inwardly by detent 16a. Upon clearing said detent 16a, the inherent bias of detent walls 24 snaps each detent 24a radially outwardly into underlying relation to detent 16a, thereby releasably holding closure member 12 to flange 16.

Stop walls, collectively denoted 26, also depend from top wall 12 and are positioned radially outwardly outboard of detent walls 24. Each stop wall is parallel to its associated detent wall and has a shorter extent. Each stop wall abuts flange 16 when closure member 12 is engaged to detent 16a.

Closure member 12 is thus understood to include top wall 20, recesses 22, detent walls 24, detents 24a, and stop walls 26. A material-saving cut-away in the form of an arch is formed in the bottom edge of each stop wall, centrally thereof.

The lower end of each upstanding wall 18 has a radially outwardly extending horizontal wall 28 from which depends a J-shaped wall having vertical section 28a and horizontal section 28b. Horizontal wall 28 and horizontal section 28b are thus vertically spaced apart by the extent of vertical section 28a.

Annular rubber or rubber-like gasket 30 has a first radially-inwardly extending end 30a captured within the vertical space between said horizontal wall 28 and said horizontal section 28b. A second, radially-outwardly and upwardly extending end of gasket 30 is denoted 30b.

Upstanding walls 18, flange 16 having detent 16a, horizontal wall 28, and J-shaped sections 28a, 28b collectively form the base of the novel structure.

The main body of lid 10 has a hollow construction and includes lower main body 32b that has a constant vertical extent around the periphery of said lower main body. Radially outwardly extending ridge 34 divides lower main body 32b from upper main body 32a but is formed integrally with each.

An upper main body is discontinuous as perhaps best understood in connection with FIGS. 1B, 2A-B, 3A and 4A, i.e., it has a first elevated section 32a' and a second, lowered section 32a" that are separated from one another to accommodate opposite ends 38a of handle 38. As drawn, the elevated section is on the right and the lowered section is on the left.

More particularly, a first space is defined where a first end of elevated first section 32a confronts a first end of second lowered section 32a" and a second space is defined where a second end of first elevated section 32a' confronts a second end of second lowered section 32a".

Figure 3A:
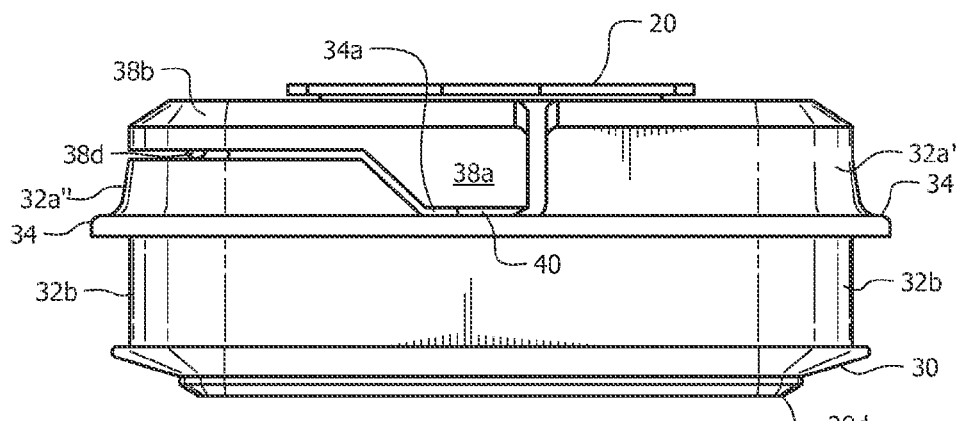
FIG. 3A is a side elevation view of the lid in its closed and locked configuration.

Handle 38 is an integrally formed part that has opposing ends 38a, 38a having a first thickness that are interconnected to one another by middle section 38b having a second thickness. As depicted in FIG. 3A, the thickness of part 38a is equal to the height of first elevated section 32a', and the thickness of middle section 38b is equal to the difference in heights between first elevated section 32a' and second lowered section 32a".

Accordingly, when handle 38 is in its folded position as depicted in FIGS. 1B, 2A, 3A-C, and 5, handle 38 is flush with the top of first elevated section 32a'. More particularly, in FIGS. 3B and 4B, the top of first elevated section 32a' is denoted 35a and the top of second lowered section 32a" is denoted 35b. The inner wall of first elevated section 32a' is denoted 32c and the inner wall of second lowered section 32a" is also denoted 32c. Said inner walls 32c, 32c are closely spaced apart from upstanding walls 18 of the base but are movably mounted with respect thereto.

Figure 4A:
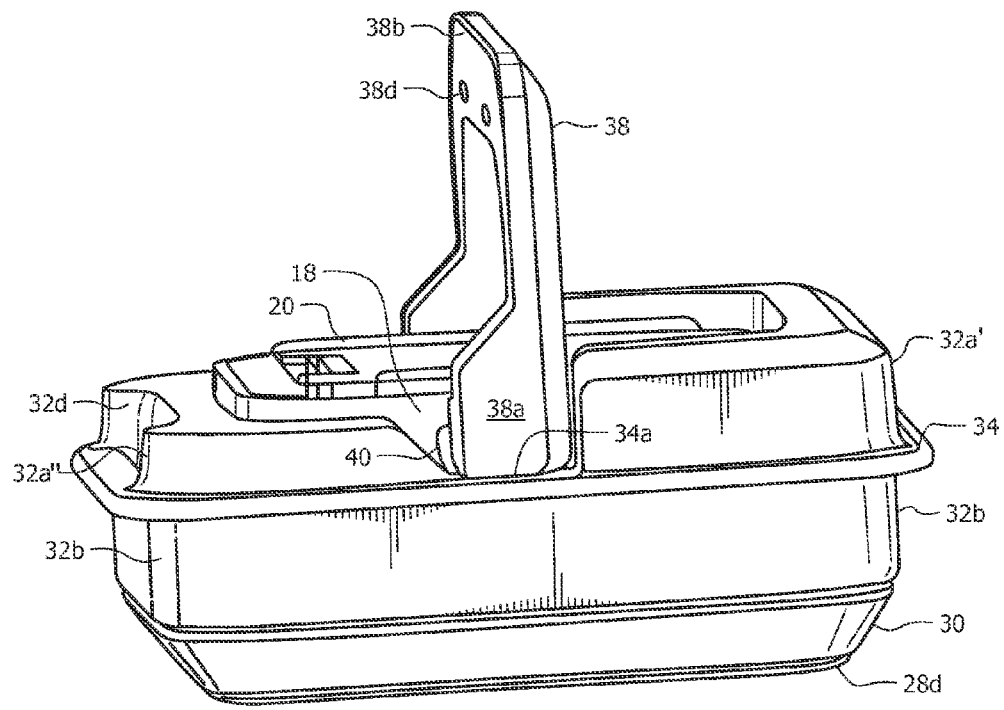
FIG. 4A is a perspective view of the lid in its open and unlocked configuration.

As depicted in FIGS. 1, 3A and 4A, protuberance 40 is formed on each of the opposite ends 38a of handle 38. When handle 38 is pivoted from its unfolded configuration to its folded configuration, protuberance 40 bears against a depression formed in ridge 34 that forms the border between upper main body 32a and lower main body 32b.

The protuberances drive ridge 34 and hence upper main body 32a downwardly so that the bottom peripheral edge of lower main body 32b abuts and drives gasket 30 downwardly into sealing engagement with a container rim, not depicted.

Each end 38a, 38a of handle 38 has a peg-receiving opening 38e (FIG. 1A) formed in it and a peg extends into each opening so that handle 38 can be pivoted between its folded position and its unfolded position. Each peg is formed integrally with an upstanding sidewall 18 and extends radially outwardly therefrom. In an unillustrated alternative embodiment, a peg could be integrally formed with each opposite end 38a of handle 38 and a peg-receiving opening could be formed in each of the associated upstanding sidewalls 18.

Second lowered section 32a" of discontinuous upper main body 32a is dished as at 32d as denoted in FIGS. 3B-C and 4A-B so that the fingers of a user may enter into the dished region when lifting handle 38 from its folded position, i.e., said dished region 32d provides an undercut to facilitate grasping of said handle 38 when folded.

Figure 3B:
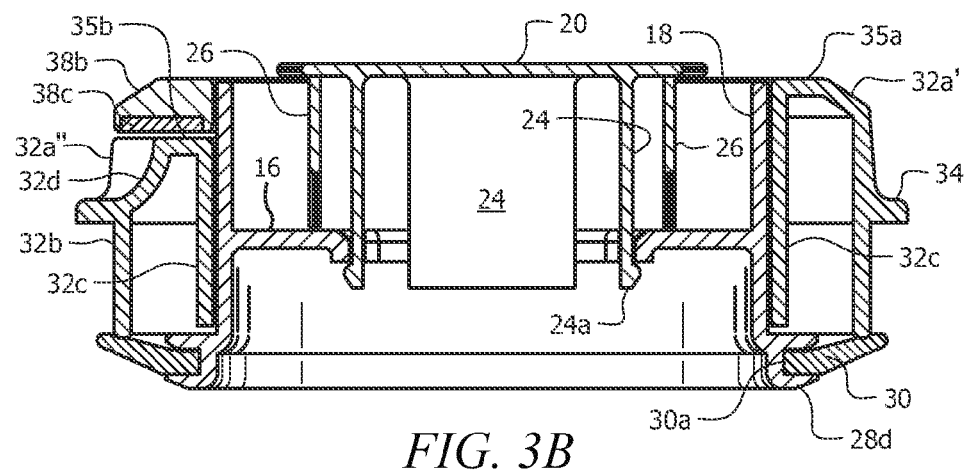
FIG. 3B is a sectional view taken along line 3B-3B in FIG. 2A.
Figure 3C:
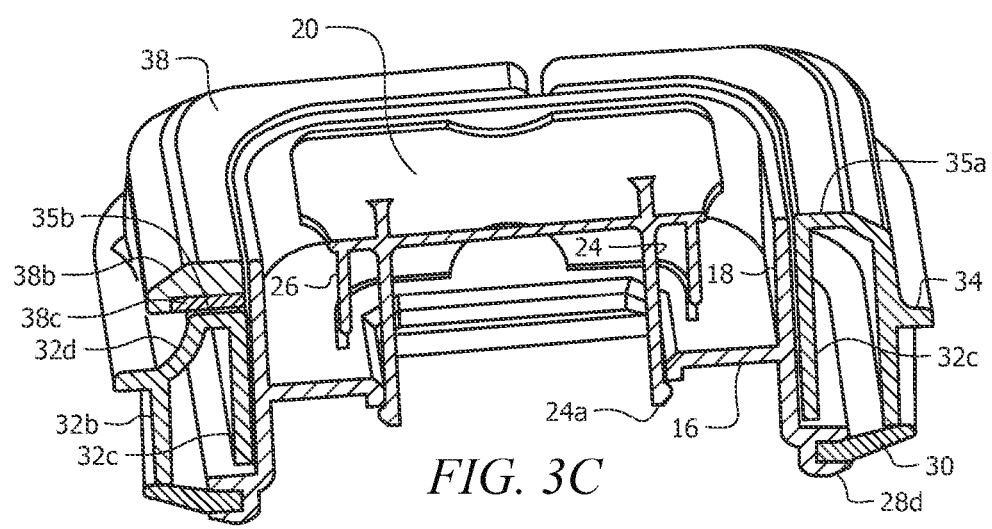
FIG. 3C is a perspective view of the structure depicted in FIG. 3B.
Figure 4B:
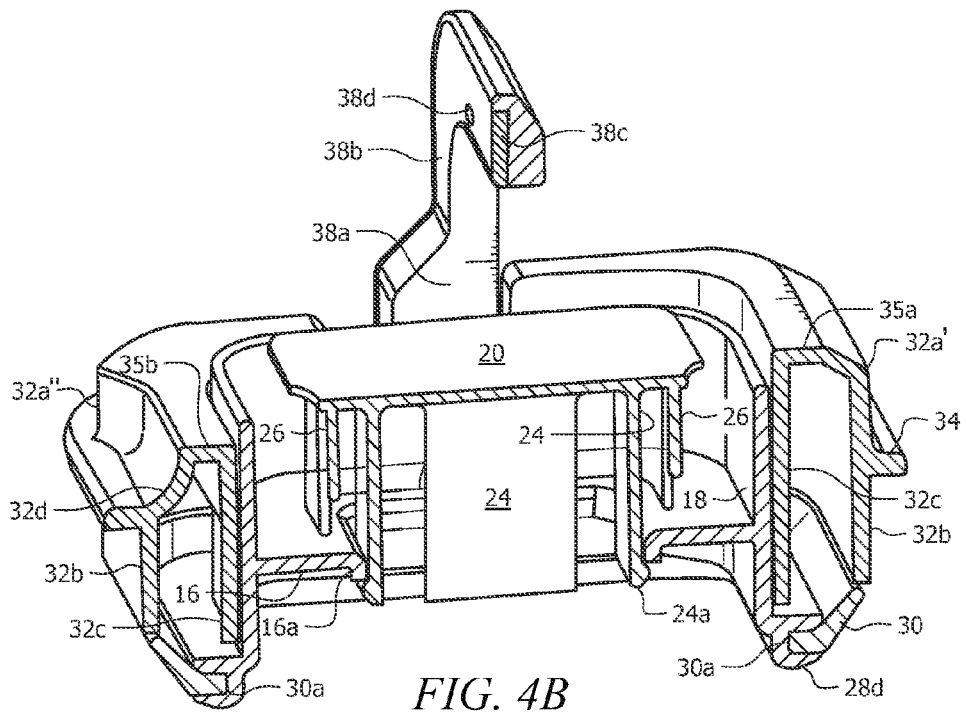
FIG. 4B is a sectional view taken along line 4B-4B in FIG. 2B and rotated into a perspective view.
Figure 5:
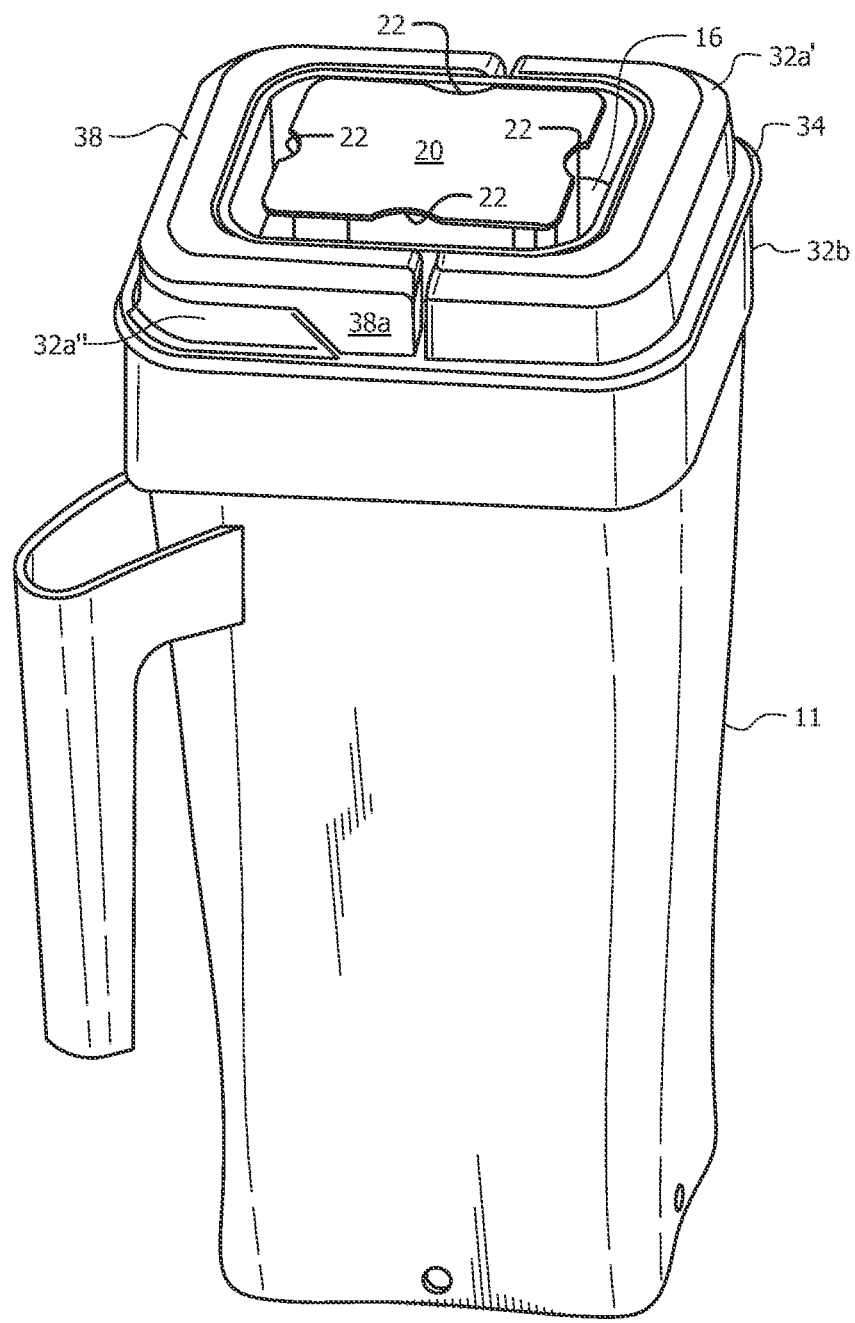
FIG. 5 is a perspective view of the lid when locked onto a container such as a blender.

Handle 38 is hollow and its bottom surface is closed by a pad 38c as denoted in FIGS. 1 and 4B. A pair of laterally spaced apart spacers 38d are formed in the bottom of pad 38c so that when handle 38 is folded as depicted in FIGS. 3A and 3B, the bottom of handle 38 does not contact top surface 35b of second lowered section 32a".

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A container lid having a handle-activated seal, comprising:
   a base having an aperture formed therein so that food items can be charged into a container through said aperture;
   a main body disposed in circumscribing relation to said base;
   a gasket positioned below said main body, said gasket adapted to seal a container rim;
   a handle;
   said handle pivotally connected to said base;
   said base and main body being movably mounted with respect to one another;
   said main body having a lower peripheral edge spaced a vertical distance above the gasket when said handle is in a vertical, not pivoted position;
   said main body pressing against said gasket and driving said gasket into sealing relation to said rim when said handle is in a pivoted, horizontal position;
   said base including upstanding sidewalls and a flange formed integrally with said upstanding sidewalls, said flange extending radially inwardly from said upstanding walls in normal relation thereto;
   a closure member disposed in releasable, closing relation to said aperture formed in said base;
   said closure member including a flat top wall;
   a detent wall depending from said flat top wall;
   a radially-outwardly extending detent formed at a lowermost end of said detent wall; and
   said flange being engaged by said radially-outwardly extending detent to secure said closure member in closing relation to said aperture.

2. The container lid of claim 1, further comprising:
   a plurality of stop walls depending from said top wall, there being as many stop walls as there are detent walls;
   each stop wall of said plurality of stop walls positioned radially outwardly of an associated detent wall;
   each stop wall having a shorter extent than its associated detent wall;
   each stop wall having a lowermost end that abuts said radially-inwardly extending flange when said detent walls of said closure member are engaged to said flange.

3. The container lid of claim 1, further comprising:
   a radially outwardly extending horizontal wall formed integrally with each of said upstanding sidewalls of said base at respective lower ends thereof;
   a J-shaped wall depending from said radially outwardly extending horizontal wall, said J-shaped wall having a vertical section and horizontal section;
   said horizontal wall and said horizontal section being vertically spaced apart by the extent of said vertical section;
   said gasket having a first, innermost end captured within the vertical space between said horizontal wall and said horizontal section; and
   said gasket having a second, radially-outwardly and upwardly extending free end.

4. The container lid of claim 3, further comprising:
   a radially outwardly extending ridge formed integrally with said main body, said ridge dividing said main body into an upper main body and a lower main body, said ridge being formed integrally with said upper main body and said lower main body;
   said lower main body having a constant vertical extent around a periphery of said main body;
   said upper main body being discontinuous, having a first section that extends less than half way about said main body and having a second section that extends less than half way about said main body;
   said first and second sections disposed in confronting, spaced apart relation to one another;
   a first space defined where a first end of the first section confronts a first end of the second section;
   a second space defined where a second end of the first section confronts a second end of the second section;
   said first section having a height greater than a height of said second section;
   said first section having a hollow construction and including an outer wall and an inner wall interconnected at their respective upper ends by a first horizontal top wall;
   said second section having a hollow construction and including an outer wall and an inner wall interconnected at their respective upper ends by a second horizontal top wall.

5. The container lid of claim 4, further comprising:
   said handle being an integrally formed part having opposing ends having a first predetermined thickness;
   said opposing ends being interconnected to one another by a middle section having a second predetermined thickness which is less than said first predetermined thickness;
   said first thickness being substantially equal to the height of said first section of said upper main body;
   said second thickness being substantially equal to a difference in heights between said first section and said second section of said upper main body;
   said first and second spaces accommodating said opposing ends of said handle therein;
   whereby said opposing ends of said handle are flush with said first horizontal top wall of said first section and said middle section of said handle is flush with said second horizontal top wall of said second section when said handle is in its folded configuration.

6. The container lid of claim 5, further comprising:
   each inner wall of said main body being closely spaced apart from said upstanding sidewalls of said base;
   said inner walls of said main body being movably mounted with respect to said upstanding sidewalls;
   said free end of said gasket disposed in vertically spaced apart relation to a bottom peripheral edge of outer walls of said lower main body when said handle is in said vertical, not pivoted position.

7. The container lid of claim 6, further comprising:
   a protuberance formed on each of said opposing ends of said handle;
   said protuberance bearing against said ridge that circumscribes said main body in the space between said first section of said upper main body and said second section of said upper main body when said handle is pivoted from its unfolded configuration to its folded configuration;
   said protuberances driving said ridge and hence said outer walls of said lower main body downwardly so that said bottom peripheral edge of said outer walls abuts and sealingly engages said free end of said gasket.

8. The container lid of claim 7, further comprising:

each end of said handle having a peg-receiving opening formed therein;

a first peg and a second peg, wherein the first peg is formed integrally with a preselected upstanding sidewall and the second peg is formed integrally with an opposed preselected upstanding sidewall, each peg extending radially outwardly into each peg-receiving opening so that said handle is pivotable between its unfolded position and its folded position.

9. The container lid of claim 8, further comprising:

said second section of said upper main body being dished to create a dished region so that the fingers of a user may enter into the dished region when lifting said handle from its folded position, said dished region providing an undercut to facilitate grasping of said handle when said handle is in its folded configuration.

10. The container lid of claim 1, further comprising:

a finger-receiving recess formed in each edge of said top wall, mid-length thereof;

said recesses facilitating manual removal of said closure member from its engagement with said aperture.

* * * * *